Feb. 26, 1929.

A. SHUTTLEWORTH

MODELING TOOL

Filed Sept. 20, 1927

1,703,785

WITNESSES
Edw. Thorpe
A. L. Kitchin

INVENTOR
Annette Shuttleworth
BY
ATTORNEY

Patented Feb. 26, 1929.

1,703,785

UNITED STATES PATENT OFFICE.

ANNETTE SHUTTLEWORTH, OF NEW YORK, N. Y.

MODELING TOOL.

Application filed September 20, 1927. Serial No. 220,736.

This invention relates to tools for molding articles, and has for an object to provide an improved construction wherein different kinds of molding materials may be utilized for molding flowers or other articles expeditiously.

Another object of the invention is to provide a tool for molding flowers or other articles, wherein a pair of prongs are presented with a curved body whereby grooves or beads may be made by varying the tension on the tool.

A further object of the invention is to provide a molding tool which is more or less pointed and flexible, together with a comparatively massive handle, whereby a firm, steady pressure of any desired tension may be applied to cause the tool to function in different ways corresponding to the different pressures used.

In the accompanying drawing—

Figure 1:
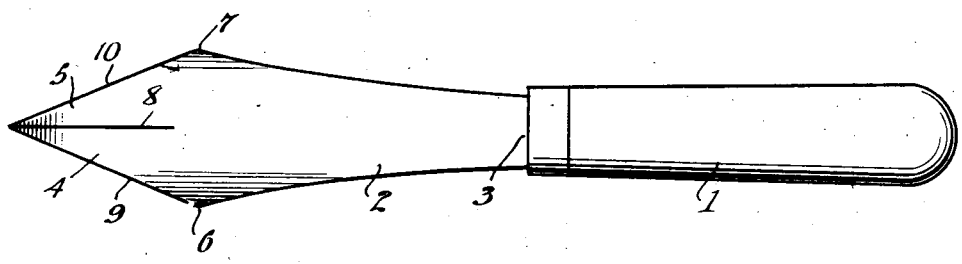
Figure 1 is a top plan view of a tool, disclosing an embodiment of the invention.
Figure 2:
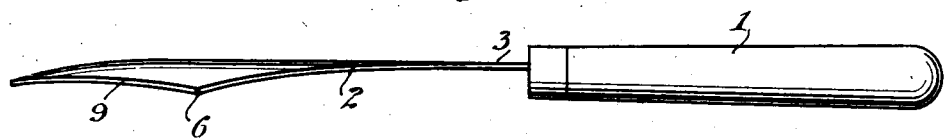
Figure 2 is a side view of the tool shown in Figure 1.
Figure 3:
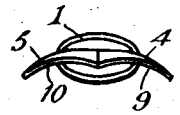
Figure 3 is a front view of the tool shown in Figure 1.

Referring to the accompanying drawing by numerals, 1 indicates a handle which is comparatively large and strong in respect to the body 2 of the tool. This body is formed with a shank 3 extending into handle 1 and with what may be termed nibs 4 and 5, very much on the order of a writing pen. From Figures 2 and 3, it will be noted particularly that the body 2 between the points 6 and 7, is curved almost on an arc. This curve is maintained from the point of nibs 4 and 5 back to the shank 3. It will also be noted that the cut or slit 8 forming nibs 4 and 5, extends to substantially a line drawn from point 6 to point 7. In this way, the principal width of the body 2 is solid, and the nibs 4 and 5 extend therefrom, said nibs being comparatively flexible. Preferably, the edges 9 and 10 are straight, whereby a flat surface may be secured when scraping the tool over a given surface.

Figure 4:
Figure 4 is a plan view of a flower formed by the tool shown in Figure 1.
Figure 5:
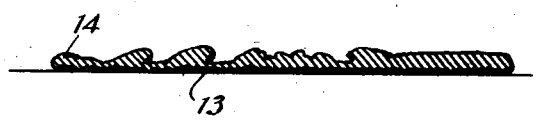
Figure 5 is a sectional view through Figure 4 on line 5—5, the same being on an enlarged scale.

In operation, the tool may be used in any desired manner, but in forming the flower as shown in Figure 4, an appreciable pressure is brought to bear on the tool so that the nibs 4 and 5 will be spread apart, and an upstanding portion 11 of the flower 12 will be formed. The flower 12 is made from a suitable plastic composition mounted preferably on a fabric background 13. This background is of any desired shape originally, and the plastic composition 14 is spread out on the background and shaped roughly with a tool into the desired shape, as for instance, a blossom and leaves as illustrated in Figure 4. After this has been done, the tool is brought into operation, and by pressing downwardly and moving forwardly on the tool, the various members 11 will be formed. Any flat places between these members may be readily smoothed out by pressing either of the edges 9 and 10 against the same when moving the tool horizontally. After the flower and leaves have been completed, the background is trimmed off around the flower and leaves and the article is ready for disposal.

By providing the nibs 4 and 5 as described, they may be spread apart by pressure, and thus form straight raised portions 11 or raised portions which will taper at both ends and which may be straight or arc-shaped to simulate the petals of a rose. When a groove is to be formed, the tool may be pressed lightly so as not to spread the nibs, or may be moved sidewise and thus cut or press a groove, simulating the veins of a leaf.

What I claim is:

1. A modeling tool, comprising a handle, a tool body formed with a shank extending into said handle, said body being arc-shaped in cross-section, and nibs extending from said body, said nibs fitting normally against each other with the outer walls arranged at an angle to each other, said outer walls being straight, said nibs being arc-shaped in cross-section, the arc of the nibs being different from the arc of the body.

2. A modeling tool including a body provided with a shank and a pair of nibs, said body being substantially arc-shaped and said nibs being resilient and arc-shaped with a shorter radius than the body, said nibs converging to a point at a distance spaced from said body.

Signed at New York in the county of New York, and State of New York this 10th day of September, A. D. 1927.

ANNETTE SHUTTLEWORTH.